Aug. 3, 1954 — J. G. BAKER — 2,685,238
CAMERA MOUNT FOR HIGH RESOLUTION AERIAL PHOTOGRAPHY
Filed May 21, 1948 — 3 Sheets-Sheet 1
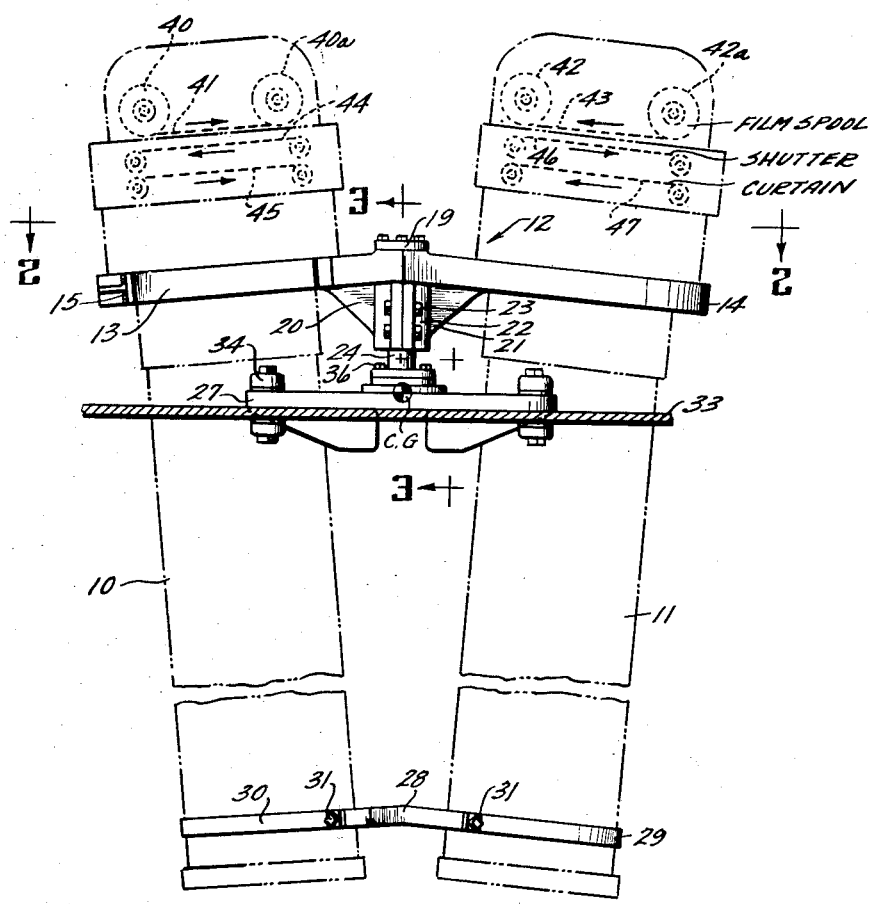
INVENTOR.
JAMES G. BAKER
BY Wade Loomly
Chester Tietig
ATTORNEYS

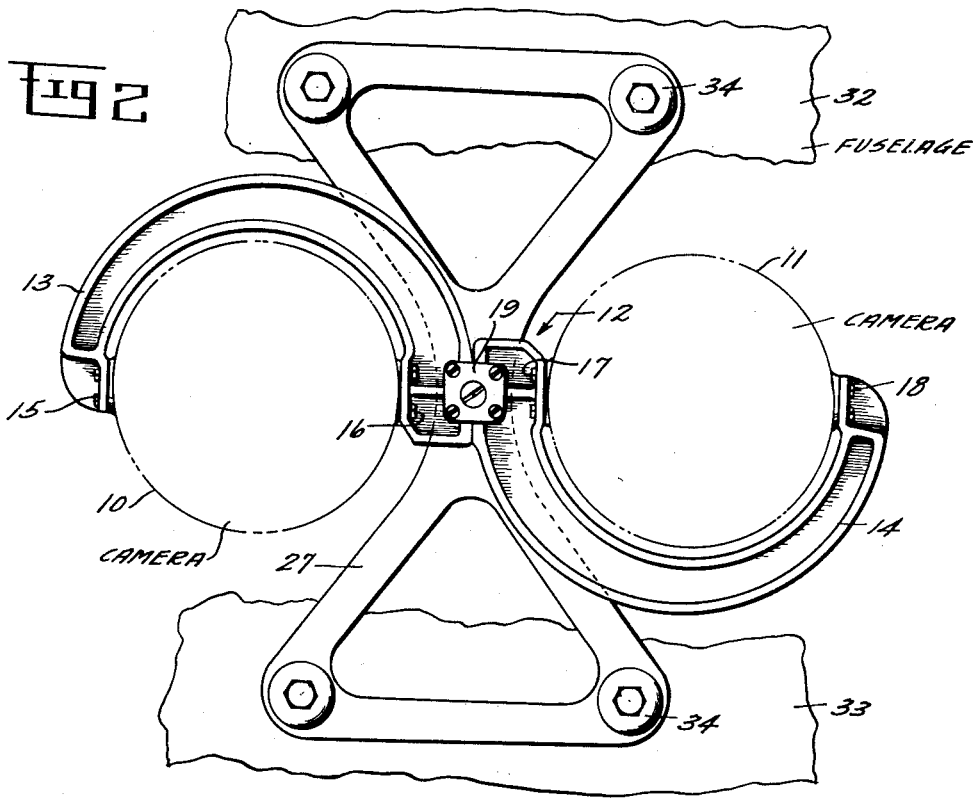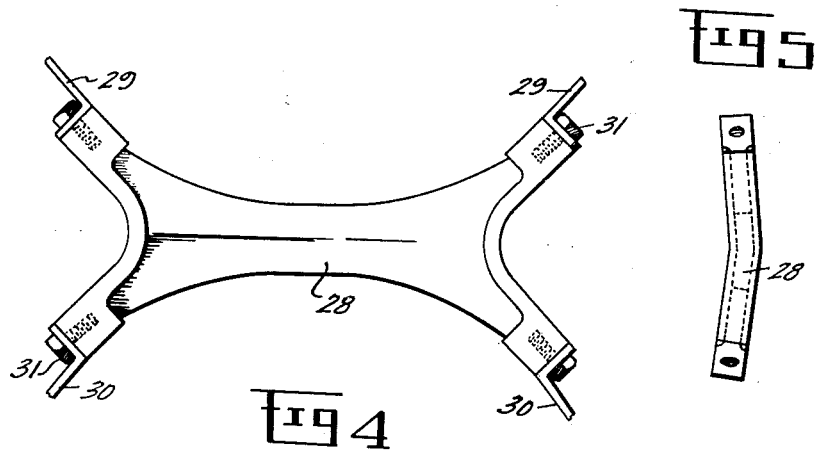

Aug. 3, 1954　　　　　J. G. BAKER　　　　　2,685,238
CAMERA MOUNT FOR HIGH RESOLUTION AERIAL PHOTOGRAPHY
Filed May 21, 1948　　　　　　　　　　　　　3 Sheets-Sheet 3
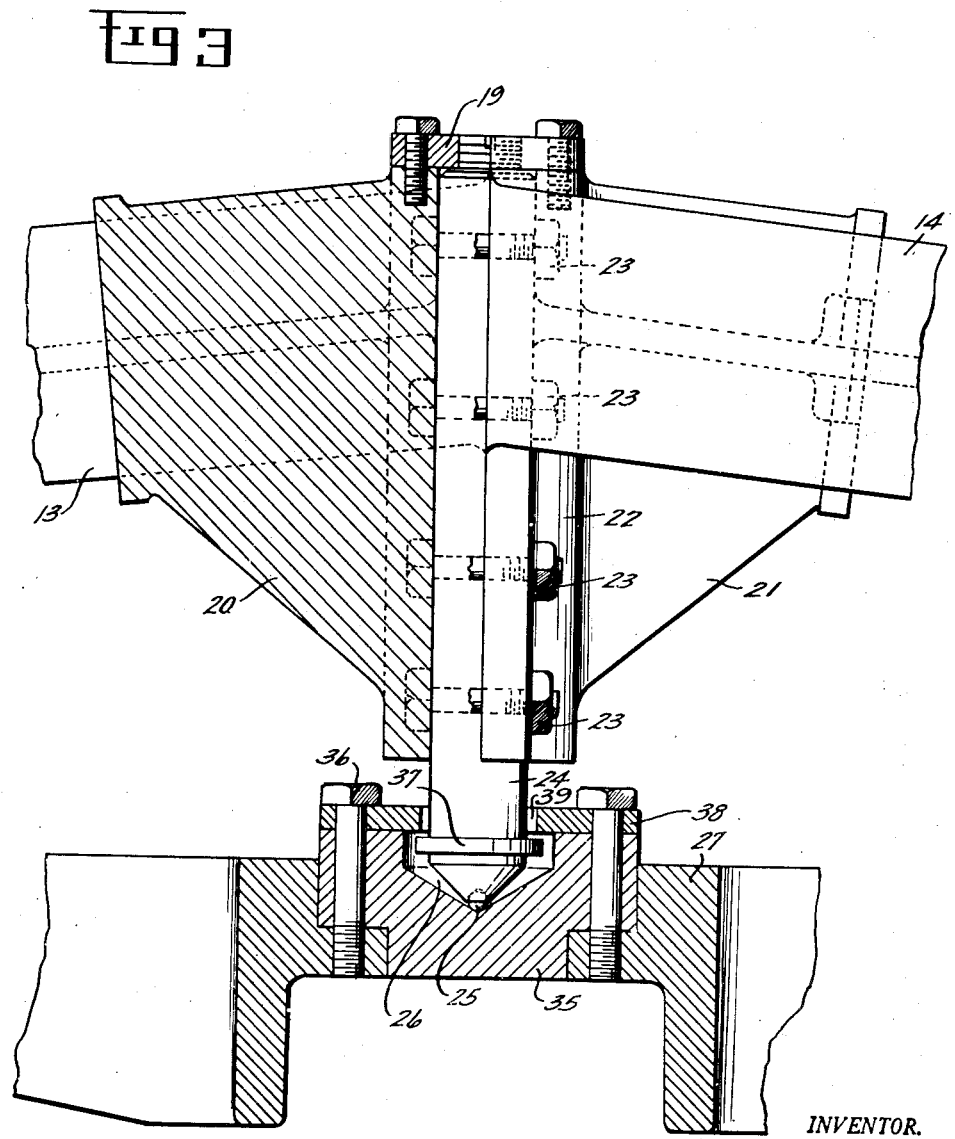
INVENTOR.
JAMES G. BAKER
BY Wade Koontz
and Chester Tietig
ATTORNEYS Patented Aug. 3, 1954

2,685,238

UNITED STATES PATENT OFFICE 2,685,238

CAMERA MOUNT FOR HIGH RESOLUTION AERIAL PHOTOGRAPHY

James G. Baker, Waban, Mass., assignor to the United States of America as represented by the Secretary of the Air Force Application May 21, 1948, Serial No. 28,333

3 Claims. (Cl. 95—12.5)

The invention described herein may be manufactured and used by or for the Government for governmental purposes without payment to me of any royalty thereon.

This invention relates to a camera mount for large twin cameras such as are used in photo-reconnaissance for telephoto military purposes.

Briefly stated, the invention resides in the provision of a mount adapted particularly for airplane use in which the two cameras are held, the mount and cameras together being balanced in all directions about a central pivot point at the center of gravity of the combined mass. At this point, a pintle upon which the weight of the cameras rests, is oscillatable about its lower end; the frame which holds the cameras is clamped to the pintle at an optional height from the lower end or point thereof.

One object of the invention is to provide a mount for two or more cameras, by which the cameras may be substantially universally pivoted at the center of gravity of their combined mass.

Another object is to reduce vibration in the cameras and mount to the greatest possible degree and to keep such vibration as is impossible to eliminate, to as low a frequency as possible, whereby to promote high resolution in the photographs.

Another object is to provide a mount for large aerial cameras whereby two or more such cameras may be pivoted about a single ball and socket joint located at substantially the center of gravity of the mass with a maximum of ease and convenience.

Another object is to provide a mount easily adaptable for the mounting of large cylindrical or conical cameras in pairs in an airplane.

Another object is to realize the above objects and advantages in a mount which is simple, rugged and comparatively cheap to construct and which requires a minimum of drilling of holes in the cameras.

Another object is to provide an operative unit comprising the cameras and their mount, in which the vibrations due to the operations of the cameras substantially cancel each other, thereby increasing the resolving power of the camera lenses under operating conditions.

Referring now to the accompanying drawings,

Fig. 1 is an elevation of the mount showing the cameras in phantom, certain internal parts of the cameras also being shown.

Fig. 2 is a cross section taken along the line 2—2 of Fig. 1. Fig. 2 is a plan view of the mount, the cameras being indicated in dotted line.

Fig. 3 is a side elevation partly in section taken along the line 3—3 of Fig. 1 and shows the oscillatable pintle which secures the remainder of the mount and the cameras held thereby. The base of the mount is shown partly in longitudinal section.

Fig. 4 is a plan view of a combined spacer and retainer for the lower ends of the cameras. The spacer is also shown in side elevation at the lower part of Fig. 1.

Fig. 5 is an end view of the spacer shown in Figs. 1 and 4.

Referring again to Fig. 1, 10 and 11 are the left and right hand cameras which are to be retained in the mount and moved freely by manual operation while airborne. The two cameras are mounted at such an angle that the views taken by them at the customary photo-reconnaissance altitude of the airplane will enable the images in the photograph to diffuse substantially during the printing operation whereby a continuous photograph of the terrain under examination may be obtained. The cameras 10 and 11 are each retained in a bight of an upper S frame 12. The left hand bight (see Fig. 2) being 13 and the right hand bight being 14. Each bight is made from a semi-circular casting or forging of I beam section. Attachment to the cameras is had at the points 15, 16, 17 and 18 where cap screws extending through openings (not shown) horizontally disposed in the bights 13 and 14 and attached to bosses on the cameras provided for the reception of the cap screws. A retainer plate 19 is provided at the junction of the bight ends whereby by means of screws, the plate 19 holds the bight ends rigidly together.

It is to be observed from Fig. 1 that the bights of the mount are angled together at such an angle of instance that the cameras will have the image-focusing effect previously mentioned. In order to perceive a rigid alignment of the cameras 10 and 11 at this angle, a pair of strong gussets 20 and 21 are provided below the S frame. Each gusset is integral with its respective half of a split sleeve 22 which is held together by bolts 23 about a pintle 24. The lower end of pintle 24 (see Fig. 3) rests on a hardened steel ball 25, which in turn, rests at the apex of an inverted cone shaped chamber 26 which is carried by an X-shaped support 27 shown in plan view in Fig. 2 and in side elevation in Fig. 1. The position at which the S frame holds the cameras 10 and 11 is such that the pintle 24 and its associated ball 25 will arise in the chamber 26 at the exact center of gravity of the combined mass represented by the cameras and all of the elements which have so far been mentioned, including an X-shaped spacer 28 which separates the cameras in inner and lower ends. The spacer 28 is angled as shown in Fig. 5 at the same angle as is the S frame. Strips 29 and 30, respectively, align cameras 11 and 10. The strips are connected to the X-shaped spacer 28 by means of cap screws 31. It is possible, by loosening the bolts 23, raising or lowering the two halves of the split sleeve 22 together with the bights 13 and 14, to change the oscillatory radius of the cameras 10 and 11 in respect to the ball 25, with consequent adjustability of balance and adaptability to various arcs of view.

As shown in Figs. 1 and 2 the X-shaped support 27 is attached to the fuselage of the airplane, the two parts of the fuselage being shown in Fig. 2 as 32 and 33. The attachment thereto is made through shock absorbing mounts 34.

For convenience in removing the cameras together with the S frame from the support 27 without removing the latter from the fuselage, there is provided (see Fig. 3) a removable bearing 35 which is attached to the support 27 by means of cap screws 36. The bearing 35 contains the inverted cone shaped chamber previously mentioned, the bearing in chamber being located in substantially the middle portion or as close thereto as may be of the support 27. Since, during the landing of an airplane, considerable shock may occur, which has a tendency to spring the entire weight of the cameras and their associated mounts out of the chamber 26, a hold-down device is provided which comprises a shoulder 37 about the lower end of the pintle 24. The shoulder 37 is located entirely below the top surface of the bearing 35. A retainer plate 38 having an opening 39 of smaller diameter than the shoulder 37 surmounts the bearing 35 and is retained thereon by the same cap screws 36 which hold the bearing 35 on to the support 27. The pintle may therefore oscillate until the shoulder engages the bottom surface of the plate 38 or the integral surface of the pintle 24 engages the inner edge of the opening 39. The cameras therefore are mounted vertically as pendulums except that the center of gravity is not in their lowest extremities.

Referring again to Fig. 1, 40 and 40a are the film spools of camera 10, 41 being the film itself. 42 and 42a are the film spools of camera 11, 43 being the film itself. Driving means (not shown) which may be an electric motor, as in conventional practice, is provided. The arrows indicate that the direction of travel of each film is opposed to that of the other. This arrangement has the advantage of minimizing vibration by wave cancellation.

A similar arrangement is used in regard to the disposition of the shutters so that their recoil vibrations will neutralize each other. The arrangement about to be described is executed with focal plane shutters, although it is to be understood that shutters of different type can be substituted without departing from he spirit of the invention.

In camera 10, 44 is a shutter of the slit curtain type. The slit is not shown. The shutter is moved by a motor drive (not shown) in the direction of the arrow. 45 is a curtain for night use, which may be suddenly retracted by means not shown because conventional. When it is retracted it moves in the direction of the arrow. In camera 11, 46 and 47 are similar elements and resemble shutter 44 and curtain 45 in every way except that their direction of operative motion is reversed to be exactly opposite to that of elements 44 and 45. Moreover, each shutter 44 and 46 operates in exactly the opposite direction from curtains 45 and 47, respectively. Recoil vibrations of each shutter and curtain pair tend to neutralize the opposite pair and each shutter tends to neutralize its cooperating curtain. The mount and shutter arrangement cooperate to bring about a unitary result, i. e. a camera battery mounted on substantially a point about which it is freely mobile within proper limits, and in which vibration from shutter recoil and film operation is largely neutralized through the structure of the mount. The mount structure permits the center of gravity (CG, Fig. 1) to be located slightly above the plane of support 33. Consequently, the lower ends of the cameras are free to point universally within the limits permitted by the distance relations between the lower surface of the plate 38 and the upper edge of the shoulder 37. Such freedom is of advantage because it enables photographs to be taken diagonally ahead of the path of flight or in any other direction within the limits specified.

I claim as my invention:

1. In a camera mount a frame curved to snugly fit about a substantial portion of the cones of two aerial telephoto cameras, a downwardly projecting pintle adjustably fitted to said frame, a ball end on the lower end of said pintle, an auxiliary frame adapted to rest on a plane surface, said auxiliary frame being substantially in the shape of the letter X, a cup to accommodate said ball at substantially the central point of said auxiliary frame and means for holding the ball end of said pintle within said cup, the relation of the frame and the cameras to each other being such that the center of gravity occurs just above the supporting surface and the lower ends of the cameras are free to be moved universally within the limits allowed by the fit of the pintle in the auxiliary frame.

2. In combination, means for holding a plurality of cameras in association with a frame at a point substantially at the center of gravity of the entire associated mass, a pintle extending downward from said means in a direction parallel to the longitudinal axis of said mass, said pintle ending as a cone, the apex of which is at the exact center of gravity, a support for said mass comprising an auxiliary frame, an inverted cone chamber bearing at the middle point of said auxiliary frame, a projecting shoulder on said pintle adapted to fit within said bearing, a plate adapted to fit around said pintle shoulder and over said bearing whereby to retain said pintle within said bearing by its shoulder, but to permit oscillation of said pintle and its associated frame and cameras as a unit with a substantial, but limited degree of freedom, said auxiliary frame being attached to a substantially horizontal surface which is free from direct vertical support, below which surface the cameras depend and are free to oscillate to substantially the same angular degree as the pintle.

3. In combination in a camera mount, an S-shaped frame adapted to hold two cylindrical cameras, said frame having an apex at the middle point thereof, a housing extending downward from said apex and incorporating gussets extending between itself and said frame, a pintle contained, except its lower end, within said housing, a substantially X-shaped support adapted to be fastened to an airplane fuselage, an inverted-cone shaped chamber carried by said support at substantially the middle thereof, a ball support for the lower end of said pintle, said ball support engaging the cone-shaped chamber at its apex and a retaining plate fitting with substantial radial clearance about said pintle, a shoulder on said pintle of larger diameter than said radial clearance, said shoulder being located slightly below said retaining plate, said plate and said pintle cooperating to retain said pintle within said chamber while allowing the pintle a limited but substantial degree of freedom to tilt until said shoulder engages said retaining plate said cameras being held in such a position by said S-shaped frame that their lower ends extend equally below said X-shaped support and are free to tilt to the same extent as the pintle.

References Cited in the file of this patent

UNITED STATES PATENTS

| Number | Name | Date |
|---|---|---|
| 1,490,239 | Taylor | Apr. 15, 1924 |
| 1,546,372 | Fairchild | July 21, 1925 |
| 2,036,062 | Lutz | Mar. 31, 1936 |
| 2,104,976 | Eliel | Jan. 11, 1938 |
| 2,433,534 | Sonne | Dec. 30, 1947 |